Patented Apr. 18, 1950

2,504,135

UNITED STATES PATENT OFFICE 2,504,135

ESTERS OF 2-HYDROXYCYCLOHEXANONE

Lucas P. Kyrides, Zeeland, Mich., assignor to Monsanto Chemical Company, St. Louis, Mo., a corporation of Delaware No Drawing. Application October 20, 1947, Serial No. 781,006

4 Claims. (Cl. 260—485)

The present invention relates to esters of dicarboxylic acids and more particularly to certain novel monoalkyl saturated aliphatic dicarboxylic esters of hydroxycyclohexanones. The principal object of this invention is to provide certain novel monoalkyl saturated aliphatic dicarboxylic esters of hydroxy-cyclohexanones. Another object is to provide improved softening or plasticizing compounds for use in plastic compositions embodying a plurality of C—O—C linkages, particularly cellulose derivatives, for example, cellulose esters and ethers such as cellulose acetate, cellulose nitrate and ethyl cellulose, and polyvinyl acetal resins. A further object is to provide a method of preparing such plasticizing compounds. These and other objects of the invention, some of which are referred to hereafter, will be apparent from this description.

The novel esters of the present invention are hydroxycyclohexanone esters of monoalkyl esters of saturated aliphatic dicarboxylic acids in which the dicarboxylic acid is selected from the group consisting of succinic, glutaric, adipic, pimelic, suberic, azelaic, and sebacic acids. The hydroxycyclohexanone from which the compounds can be considered to be derived may be 2-hydroxycyclohexanone, 3-hydroxyclohexanone, 4-hydroxycyclohexanone, polyhydroxycyclohexanone and homologues thereof, although because of ease of preparation, the monoalkyl saturated aliphatic dicarboxylic acid esters of 2-hydroxycyclohexanone are preferred.

Illustrative of the novel esters of the present invention are the butyl succinyl ester, the ethyl glutaryl ester, the methyl pimelyl ester, the dodecyl suberyl ester, the octyl azelayl ester, and the isopropyl sebacyl ester, respectively, of 2-hydroxycyclohexanone. The hydrocarbon residues of the dicarboxylic acid residues of this series of derivatives range from 2 carbon atoms to 8 carbon atoms, inclusive. The monoalkyl residue in applicant's novel esters may contain from 1 to 12 carbon atoms and are derived from the series of aliphatic alcohols ranging from methyl alcohol to dodecyl alcohol including the isomeric homologues such as isopropyl, secondary butyl and the like.

In preparing the novel esters of the present invention, it is desirable first to prepare the monoalkyl ester of the saturated aliphatic dicarboxylic acid by reacting the desired monohydric aliphatic alcohol with the acid, thereafter forming a water soluble salt of the resulting compound and subsequently reacting 2-chlorocyclohexanone with the aforescribed salt, desirably by adding the 2-chlorocyclohexanone in small portions to the reaction mixture in which the salt was formed. The resulting ester may be recovered by any suitable means, for example, by first stripping off the excess alcohol, thereafter cooling and washing the residue and stirring it into water while maintaining the water in an alkaline state by the addition of alkali thereto. The oily layer resulting from this treatment may thereafter be washed and steam distilled to recover the ester.

The following examples will serve to illustrate the novel esters of the present invention and the process for their preparation. These examples are to be construed merely as illustrative and not as limiting the scope of the invention.

EXAMPLE I

*Butylsuccinyl ester of 2-hydroxycyclohexanone*

Into a flask provided with a stirrer, a reflux condenser, a thermometer, and a dropping tube, is charged 50 g. of succinic anhydride (about 0.5 mole) and 150 g. of anhydrous butyl alcohol (about 2 moles). The mixture is heated to reflux temperature (about 120° C.) while stirring, and is refluxed gently for about one hour at this temperature. The mixture containing monobutylsuccinic acid is then allowed to cool to about 95° C., and 34.7 g. of anhydrous (99.5%) potassium carbonate (about 0.25 mole) is added slowly with stirring over the course of one-half hour while the temperature is maintained at 90° C. to 95° C. The mixture is thereafter heated and refluxed through a column, the forward flow from the column passing through a water separator. The water removal is continued for about an hour. To this remaining solution is then added 66.3 g. of 2-chlorocyclohexanone (about 0.5 mole) in small portions (approximately 10 minutes being required for the addition). After this addition the mixture is refluxed for 5 to 10 hours.

From the reaction mixture the monobutylsuccinyl ester of 2-hydroxycyclohexanone may be recovered as follows: The excess alcohol is removed by distillation in vacuum to a maximum temperature of 120° C. or thereabout at a pressure of 20 mm. The mixture is then cooled and washed with 200 cc. of warm water (60° to 70° C.) and is thereafter stirred into 200 cc. of water containing about 12 grams of sodium carbonate, or more, if required to maintain the mixture alkaline to phenolphthalein. The aqueous layer is separated and the oily layer is again washed several times with water, preferably by heating at 60° to 70° C. with water for periods of about 30 minutes for each washing. The washed oil is then steamed until about 500 cc. of distillate is collected. The ester is cooled and treated with dilute alkaline solutions for further purification followed by two water washes. The water is separated and the oil is vacuum dried. The dried oil is then treated with 0.6 g. of activated charcoal to remove color. The weight of oil obtained was 125.7 g. which is equivalent to a yield of 93.1% based on succinic anhydride used.

The monobutylsuccinyl ester of 2-hydroxycyclohexanone has a saponification number of 138; refractive index at 25° C. of 1.4550; sp. g.

$$\frac{25}{25} 1.0654$$

and boiling point of 290–5° C.

EXAMPLE II

*Methyl pimelyl ester of 2-hydroxycyclohexanone*

Into a flask provided with a stirrer, a reflux condenser, a thermometer, and a dropping tube, is charged 0.5 mole of pimelic anhydride and 3 moles of anhydrous methyl alcohol. The mixture is heated to reflux temperature while stirring, and is refluxed gently for about one hour at this temperature. The mixture containing monomethyl-pimelic acid is then allowed to cool to 60° C., and 0.25 mole of anhydrous (99.5%) potassium carbonate is added slowly with stirring over the course of one-half hour while the temperature is maintained at 60–65° C. Methanol and water are then distilled out until a reactor temperature of about 90° C. is reached. To this remaining solution is then added 0.5 mole of 2-chlorocyclohexanone in small portions (about 10 minutes being required for the addition). After this addition, the mixture is refluxed for 5 to 10 hours.

From the reaction mixture the monomethyl pimelyl ester of 2-hydroxycyclohexanone may be recovered as follows: The excess methanol is removed by distilling in a vacuum to a maximum temperature of approximately 120° C. at a pressure of 20 mm. The mixture is then cooled and washed with 200 cc. of water containing about 12 grams of sodium carbonate, or more, if required to maintain the mixture alkaline to phenolphthalein. The aqueous layer is separated and the oily layer is again washed several times with water, preferably by heating at 60°–70° C. with water for periods of about 30 minutes for each washing. The washed oil is then steamed until about 500 cc. of distillate is collected. The distillate is cooled, washed and treated with dilute alkaline solutions for further purification followed by two water washes. The water is separated and the oil vacuum dried. The dried oil is then treated with 0.5% of activated charcoal to remove color. The product thus recovered is the methyl pimelyl ester of 2-hydroxycyclohexanone.

EXAMPLE III

*Ethyl glutaryl ester of 2-hydroxycyclohexanone*

Into a flask provided with a stirrer, reflux condenser, a thermometer, and a dropping tube, is charged 0.5 mole of glutaric anhydride and 3 moles of anhydrous ethyl alcohol. The mixture is heated to reflux temperature while stirring, and is refluxed gently for about one hour at this temperature. The mixture containing monoethylglutaric acid is then allowed to cool to about 75° C., and 0.25 mole of anhydrous (99.5%) potassium carbonate is added slowly with stirring over the course of one-half hour while the temperature is maintained at 70–75° C. Ethanol and water are then distilled out to a reactor temperature of about 90–100° C. To this remaining solution is then added 0.5 mole of 2-chlorocyclohexanone in small portions (about 10 minutes being required for the addition). After this addition, the mixture is refluxed for 5 to 10 hours.

From the reaction mixture, the monoethylglutaryl ester of 2-hydroxycyclohexanone may be recovered as follows: The excess ethanol is removed by distilling in a vacuum to a maximum temperature of approximately 120° C. at a pressure of 20 mm. The mixture is then cooled and washed with 200 cc. of water containing about 12 grams of sodium carbonate, or more, if required to maintain the mixture alkaline to phenolphthalein. The aqueous layer is separated and the oily layer is again washed several times with water, preferably by heating at 70–75° C. with water for periods of about 30 minutes for each washing. The washed oil is then steamed until about 500 cc. of distillate is collected. The distillate is cooled, washed and treated with dilute alkaline solutions for further purification followed by two water washes. The water is separated and the oil vacuum dried. The dried oil is then treated with 0.5% of activated charcoal to remove color. The product thus recovered is the ethyl glutaryl ester of 2-hydroxycyclohexanone.

EXAMPLE IV

*Octyl azelyl ester of 2-hydroxycyclohexanone*

Into a flask provided with a stirrer, a reflux condenser, a thermometer, and a dropping tube is charged 0.5 mole of azelaic anhydride and 4 moles of octyl alcohol (anhydrous). The mixture is heated to about 130° C. while stirring, and is held for about one hour at this temperature. The mixture containing mono-octyl azelaic acid is then allowed to cool to about 95° C. and 0.25 mole of anhydrous (99.5%) potassium carbonate is added slowly with stirring over the course of one-half hour while the temperature is maintained at 90–95° C. The mixture is thereafter heated and refluxed through a column under reduced pressure, the forward flow from the column passing through a water separator. The water separation is continued for about an hour. To this remaining solution is then added 0.5 mole of 2-chlorocyclohexanone in small portions (about 10 minutes being required for the addition). After this addition, the mixture is refluxed for 5 to 10 hours.

From the reaction mixture, the monooctyl-azelyl ester of 2-hydroxycyclohexanone may be recovered as follows: The excess octyl alcohol is removed by distilling in a vacuum to a maximum temperature of approximately 120° C. at a pressure of 20 mm. The mixture is then cooled and washed with 200 cc. of water containing about 12 grams of sodium carbonate, or more, if required to maintain the mixture alkaline to phenolphthalein. The aqueous layer is separated and the oily layer is again washed several times with water, preferably by heating at 90–95° C. with water for periods of about 30 minutes for each washing. The washed oil is then steamed until about 500 cc. of distillate is collected. The distillate is cooled, washed and treated with dilute alkaline solutions for further purification followed by two water washes. The water is separated and the oil vacuum dried. The dried oil is then treated with 0.5% of activated charcoal to remove color. The product thus recovered is the octyl azelyl ester of 2-hydroxycyclohexanone.

EXAMPLE V

*Dodecyl suberyl ester of 2-hydroxycyclohexanone*

Into a flask provided with a stirrer, a reflux condenser, a thermometer, and a dropping tube is charged 0.5 mole of suberic anhydride and 4 moles of anhydrous dodecyl alcohol. The mixture is heated to about 130° C. while stirring, and is held for about one hour at this temperature. The mixture containing monododecyl suberic acid is then allowed to cool to about 95° C., and 0.25 mole of anhydrous (99.5%) potassium carbonate is added slowly with stirring over the course of one-half hour while the temperature is maintained at 90–95° C. The mixture is thereafter heated and refluxed through a column under reduced pressure, the forward flow from the column passing through a water separator. The water separation is continued for about an hour. To this remaining solution is then added 0.5 mole of 2-chlorocyclohexanone in small portions (about 10 minutes being required for the addition). After this addition the mixture is refluxed for 5 to 10 hours.

From the reaction mixture the monododecyl suberyl ester of 2-hydroxycyclohexanone may be recovered as follows: The excess dodecyl alcohol is removed by evaporation in vacuum to a maximum temperature of approximately 120° C. at a pressure of 200 mm. The mixture is then cooled and washed with 200 cc. of warm water (60–70° C.) and is thereafter stirred into 200 cc. of water containing about 12 grams of sodium carbonate, or more, if required to maintain the mixture alkaline to phenolphthalein. The aqueous layer is separated and the oily layer is again washed several times, with water, preferably by heating at 60–70° C. with water for periods of about 30 minutes for each washing. The washed oil is then steamed until about 2000 cc. of distillate is collected. The distillate is cooled, washed and treated with dilute alkaline solutions for further purification, followed by two water washes. The water is separated and the oil vacuum dried. The dried oil is then treated with 0.5% of activated charcoal to remove color. The product thus recovered is the dodecyl suberyl ester of 2-hydroxycyclohexanone.

EXAMPLE VI

*Isopropyl sebacyl ester of 2-hydroxycyclohexanone*

Into a flask provided with a stirrer, a reflux condenser, a thermometer, and a dropping tube is charged 0.5 mole of sebacic anhydride and 2 moles of anhydrous isopropyl alcohol. The mixture is heated to reflux temperature while stirring, and is refluxed gently for about one hour at this temperature. The mixture containing monoisopropyl sebacic acid is then allowed to cool to about 95° C., and 0.25 mole of anhydrous (99.5%) potassium carbonate is added slowly with stirring over the course of one-half hour while the temperature is maintained at 80–85° C. Isopropyl alcohol and water are distilled out until a reactor temperature of approximately 100° C. is reached. To this remaining solution is then added 0.5 mole of 2-chlorocyclohexanone in small portions (about 10 minutes being required for the addition). After this addition the mixture is refluxed for 5 to 10 hours.

From the reaction mixture the monoisopropyl sebacyl ester of 2-hydroxycyclohexanone may be recovered as follows: The excess alcohol is removed by distillation in vacuum to a maximum temperature of 120° C. or thereabout at a pressure of 20 mm. The mixture is then cooled and washed with 200 cc. of warm water (60–70° C.) and is thereafter stirred into 200 cc. of water containing about 12 grams of sodium carbonate, or more if required to maintain the mixture alkaline to phenolphthalein. The aqueous layer is separated and the oily layer is again washed several times with water, preferably by heating at 60–70° C. with water for periods of about 30 minutes for each washing. The washed oil is then steamed until about 500 cc. of distillate is collected. The distillate is cooled, washed and treated with dilute alkaline solutions for further purification, followed by two water washes. The water is separated and the oil vacuum dried. The dried oil is then treated with 0.5% of activated charcoal to remove color. The product thus recovered is the isopropyl sebacyl ester of 2-hydroxycyclohexanone.

The novel esters of the present invention are compatible to a remarkable extent with polyvinyl acetal resins, polyvinyl chloride resins and cellulose derivatives such as cellulose acetate, cellulose nitrate, and ethyl cellulose. The plastic compositions resulting from such admixture are characterized by excellent stability to light, good flexibility, high tensile strength and satisfactory elongation.

In preparing mono-ethyl succinic acid, or the mono-ethyl or other monoalkyl esters of glutaric, adipic, pimelic, suberic, azelaic or sebacic acids, the dialkyl ester of the acid may first be prepared and this di-ester may then be reacted with a molar equivalent of the free acid to form a mixture containing as one constituent the monoalkyl ester. The procedure for this purpose may be that described by Fourneau and Sabetay in Bulletin de la Societe Chimique de France (4), 43, 861, or that described by Swann, Oehler and Buswell in Organic Syntheses, 19, 45 (1939). The monoalkyl ester may then be isolated by conventional methods, for example, by fractional distillation, and thereupon reacted with 2-chlorocyclohexanone according to the method of Example IV.

According to the general method of preparing esters of hydroxycyclohexanones illustrated in the foregoing examples, the procedure consists essentially in reacting a chlorinated cyclohexanone or a chlorination mixture containing unreacted cyclohexanone with a sodium or potassium salt of the acid corresponding to the desired ester in the presence of the free acid, under substantially anhydrous conditions. Other alkali-metal salts of the acid may be used, if desired. Isomeric chlorocyclohexanones may be used to prepare the corresponding derivatives although the invention is specifically directed to the use of 2-chlorocyclohexanone, which is the principal product obtained on direct chlorination of cyclohexanone. Brominated or iodinated cyclohexanones may be used instead of the chlorinated derivatives, in which case the reaction is faster but not as well adapted to commercial utilization. Other conventional methods of purification may be used for recovery of the ester of the hydroxycyclohexanone as is obvious.

In my method of preparing esters of hydroxycyclohexanones I use approximately stoichiometrical quantities of the alkali-metal salt of the acid and the halogenated cyclohexanone, although an excess of about 50% or somewhat more of the alkali-metal salt of the acid may be used to drive the reaction with the halogenated chlorocyclohexanone toward completion. However, I prefer to avoid the use of free acid, or use it only in an amount corresponding stoichiometrically to approximately not more than that of the alkali-metal salt. The reaction mixture is heated at reflux temperatures for periods of one hour or longer, generally from four to thirty hours, as shown in the examples; or if large batches or somewhat less reactive substances are used, the reaction period may be even longer than this.

The esters of hydroxycyclohexanones are powerful solvents and plasticizers for cellulose esters such as cellulose nitrate and acetate. In respect to their action on cellulose nitrate they resemble camphor very closely and as plasticizers for cellulose nitrate are superlative camphor substitutes possessing properties not possessed by camphor. In general, the plasticizers are compatible with plastic substances embodying a plurality of C—O—C linkages as typified by polyvinyl acetal resins and cellulose derivatives such as cellulose esters and ethers.

This application is a continuation-in-part of my co-pending application, Serial No. 505,359, filed October 7, 1943, now abandoned.

I claim:

1. A monoalkyl saturated aliphatic dicarboxylic ester of 2-hydroxycyclohexanone in which the aliphatic dicarboxylic residue has a hydrocarbon residue containing from 2 to 8 carbon atoms.

2. Mono-butyl succinyl ester of 2-hydroxycyclohexanone.

3. Mono-octyl azelyl ester of 2-hydroxycyclohexanone.

4. Mono-isopropyl sebacyl ester of 2-hydroxycyclohexanone.

LUCAS P. KYRIDES.

No references cited.